Dec. 9, 1924.
A. STASAK
1,518,229
HEADLIGHT OPERATING MECHANISM
Filed Aug. 27, 1923  2 Sheets-Sheet 1
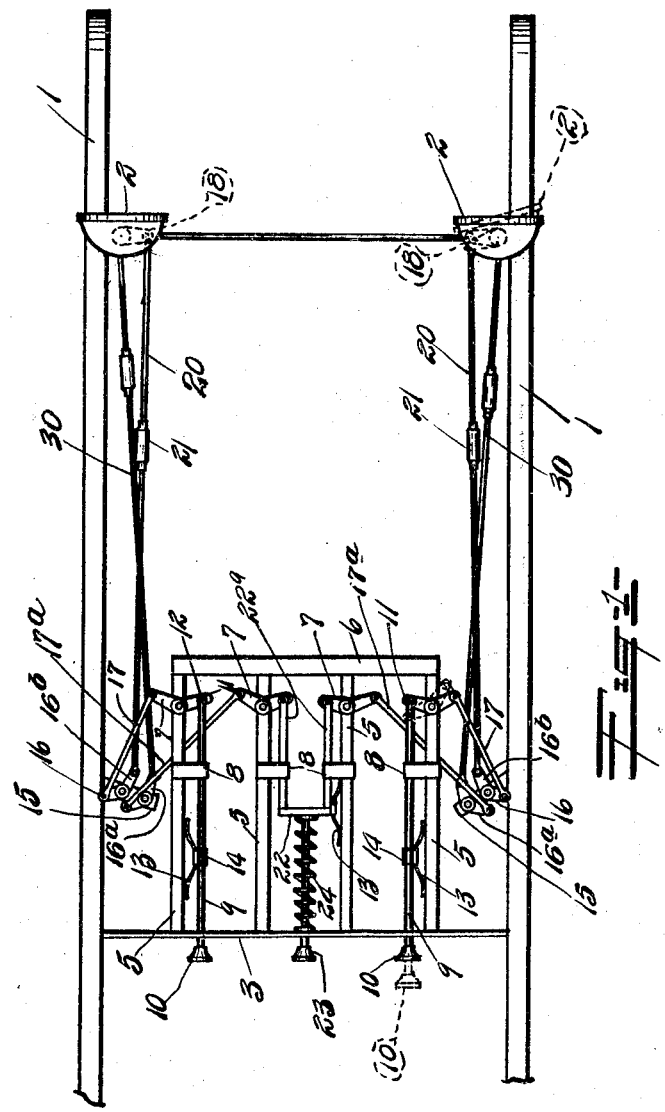
INVENTOR.
Alois Stasak.
BY
Frank C. Earman
ATTORNEY.

Dec. 9, 1924.  1,518,229
A. STASAK
HEADLIGHT OPERATING MECHANISM
Filed Aug. 27, 1923   2 Sheets-Sheet 2
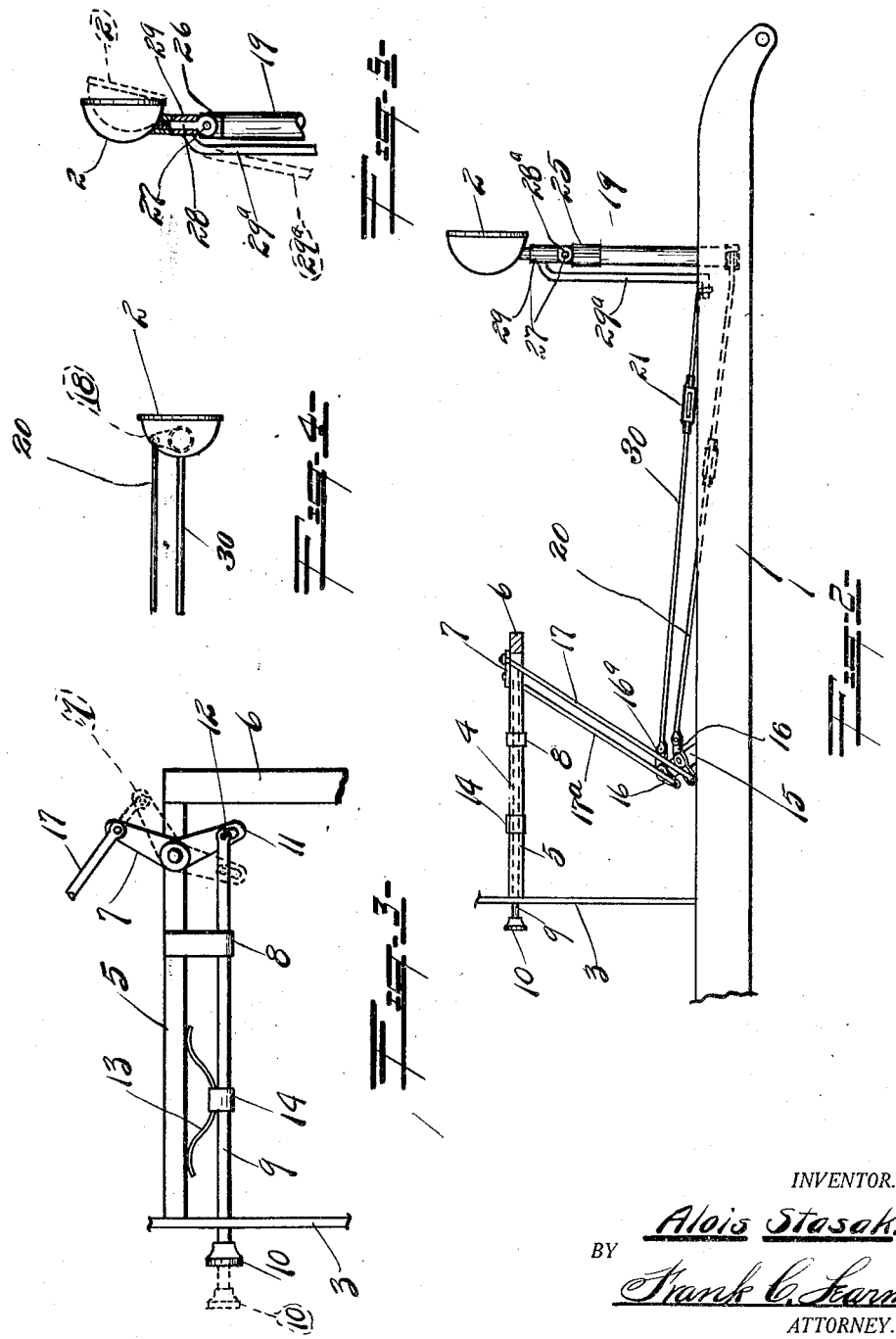
INVENTOR.
Alois Stasak.
BY Frank C. Fearman
ATTORNEY.

Patented Dec. 9, 1924.

1,518,229

UNITED STATES PATENT OFFICE.

ALOIS STASAK, OF DETROIT, MICHIGAN.

HEADLIGHT-OPERATING MECHANISM.

Application filed August 27, 1923. Serial No. 659,476.

*To all whom it may concern:*

Be it known that I, ALOIS STASAK, a citizen of the United States of America, and a resident of Detroit, in the county of Wayne and State of Michigan, have invented certain new and useful Improvements in Headlight-Operating Mechanism, of which the following is a specification.

This invention relates to controlling mechanism for automobile headlights and the like.

One object of the invention is to design a controlling mechanism so that the conventional head lights can be oscillated to serve as a spot light, as well as the purpose for which they are intended.

Another object is to provide a mechanism for tilting the head lights, so that the rays of light will be directed at an angle towards the ground directly in front of the vehicle.

A further object is to provide a simple, substantial and durable operating mechanism, economical to manufacture and easy to install and operate.

With the above and other objects in view, the present invention consists in the combination and arrangement of parts, hereinafter more fully described, illustrated in the accompanying drawings, and particularly pointed out in the appended claims, it being fully understood that changes may be made in the form, size, proportion and minor details of construction, without departing from the spirit, or sacrificing any of the advantages of the invention.

In the drawings:—

Fig. 1 is a fragmentary top plan view of an automobile illustrating my head light operating mechanism in place thereon.

Fig. 2. is a side view thereof.

Fig. 3 is an enlarged side view of the head light actuating mechanism, illustrating the operating rod, etc., the dotted lines illustrating the operating rod pulled out to turn the light.

Fig. 4. is a fragmentary top plan view of the head light and the oscillating mechanism associated therewith.

Fig. 5. is a fragmentary side view of one of the head lights and the associated tilting mechanism, the dotted lines illustrating the head light in tilted position.

A great many automobile owners have a spot light attached to their automobile, this is in addition to the conventional headlights with which a motor vehicle is equipped, this additional light is an added drain on the storage battery, is an extra appliance to obstruct the vision in the daytime, and is otherwise objectionable due to the fact that it is very often so adjusted that it is blinding to the drivers of oncoming automobiles, and I have therefore designed and perfected an operating mechanism for controlling the lights, so that they will function as headlights and spotlights combined.

Referring now particularly to the drawing in which I have shown the preferred embodiment of my invention, the numeral 1 indicates the frame of a motor vehicle on which the head lights 2 are mounted, the dash or cowl of the vehicle being indicated at 3, and a switch mechanism 4 is mounted adjacent thereto. This switch mechanism comprises a frame made up of the plurality of longitudinally disposed members 5, securely connected to the transverse member 6 at the one end, and to the dash or cowl 3 at the other.

Bell cranks 7 are pivotally mounted on this member 5, and bearings 8 are also secured thereto as shown, a rod 9 being slidably mounted in said bearing, the one end projecting through the cowl and having a knob 10 secured thereon, while the opposite end is connected to the leg 11 of the bell crank 7 at the point 12, a friction member 13 being secured to the rod by means of a clip 14 to prevent rattling and hold the rod in its adjusted position.

A brace 15 is secured to and extends at an angle from the vehicle frame, and a pair of bell cranks 16 and 16$^a$ are pivotally mounted thereon, and are connected to the bell cranks 7 by means of the rods 17 and 17$^a$. A crank 18 is secured to the tubular support 19 on which the headlight is mounted, and a rod 20 is connected thereto and to the one leg 16$^b$ of the bell crank 16, a turn buckle 21 being provided intermediate the length of the said rod, and it will be obvious that by pulling outwardly on the knob 10 that the headlight will be turned or oscillated to serve as a spot light as clearly shown by dotted lines in Figs. 1 and 4. Each headlight is mounted and controlled in exactly the same manner but is operated by a separate knob.

The so called dimming of the headlights is usually accomplished by means of a switch, but in my improved mechanism this is accomplished by simultaneously tilting the headlights downwardly, so that the rays of light do not project horizontally straight ahead, but are directed downwardly at an angle directly in front of the machine, and this is done by the manipulation of the switch 22, the end 23 of which projects through the cowl as shown. The legs 22ª of the said switch are pivotally connected to the bell cranks 7. A friction member 13 is also secured to the one leg and a coiled spring member 24 is mounted on the rod 23, and tends to normally hold the head lights in proper position so that the rays of light will be directed ahead of the machine.

The connection between the switch and the headlights comprises the bell cranks 7 and 16ª, which are connected by rods 17ª, the one leg of the bell crank 16ª being pivotally connected to a rod which is connected to the head lights in a manner to be presently described.

The head light support comprises the tubular member 19 mounted in the bearing 25, this tubular member is split as shown at 26 and is adapted to receive the eye 27 of the eyebolt 28 which is pivoted thereto by means of the pin 28ª. A tubular bearing member 29 is mounted on the member 28 and is formed with a downwardly projecting arm 29ª as shown. The lower end of this arm 29ª being connected to a rod 30 the opposite end of which is connected to the bell crank 17ª and it will be obvious that when the rod 23 is pulled outwardly that the rod 30 which is connected to the arm 29ª will be simultaneously actuated, rocking the member 28 on its pivot 28ª and tilting the lights as clearly shown in dotted lines in Fig. 5. This will in no manner interfere with the turning movement.

From the foregoing description it will be obvious that I have perfected a simple and efficient headlight controlling mechanism which will allow the lights to be tilted for diming, or oscillated to function as a spot light as desired.

What I claim is:

1. In a device of the character described, a split tubular member, an eyebolt pivotally connected thereto, a headlight mounted on said eyebolt, a bearing surrounding the shank of said eyebolt and provided with a downwardly extending arm, a crank fixed on the tubular member, rods connected to said arm and crank respectively, and a switch having connection with said rods for actuating said headlights.

2. In a device of the character described, a split tubular member having a headlight pivotally mounted thereon, a bearing on which said headlight may be oscillated, and a downwardly projecting arm secured to said bearing, a crank on the end of said tubular member, and rods connected to said arm and crank respectively, a spring tensioned switch mechanism, and connections between said rods and the switch to allow the headlights to be selectively oscillated or tilted.

3. In a device of the character described, a split tubular member having a headlight pivotally mounted thereon, a crank fixed to the lower end thereof, a bearing above the pivoting point and in which said headlight may be oscillated, a downwardly projecting arm formed integral therewith, a switch mechanism controlling said headlights, and rods connecting the switch and said crank and arm respectively, a spring tensioned knob for simultaneously tilting the said lights, and independent knobs for selectively oscillating either of the said headlights.

4. In a device of the character described, a tubular member having a headlight pivotally mounted thereon, a bearing, a crank fixed on the end of said member, a bearing above the said pivoting point and having a downwardly projecting arm integral therewith, a switch mechanism comprising a plurality of rods, bell cranks to which said rods are connected, rods connecting said bell crank with similar bell cranks adjacent the said switch, and adjustable rod connections between the bell cranks and the said cranks and arms for selectively tilting or oscillating the said headlights.

5. In a device of the character described, a tubular member having a headlight pivotally connected thereto, a bearing, a crank fixed on the end of said tubular member, a hollow tubular bearing in which said headlight is mounted and a downwardly projecting arm formed integral with the tubular bearing, a switch mechanism, and rods connecting the said switch and the crank and arm respectively, whereby the lights may be selectively tilted or oscillated.

In testimony whereof I affix my signature.

ALOIS STASAK.